United States Patent
Gaal

(10) Patent No.: US 7,920,661 B2
(45) Date of Patent: Apr. 5, 2011

(54) DECISION FEEDBACK EQUALIZER FOR CODE DIVISION MULTIPLEXED SIGNALS

(75) Inventor: Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 900 days.

(21) Appl. No.: 11/386,534

(22) Filed: Mar. 21, 2006

(65) Prior Publication Data

US 2007/0223565 A1    Sep. 27, 2007

(51) Int. Cl.
*H04B 7/10* (2006.01)
(52) U.S. Cl. ........................................ 375/347; 375/233
(58) Field of Classification Search .................. 375/233, 375/347
See application file for complete search history.

(56) References Cited

U.S. PATENT DOCUMENTS

| | | | |
|---|---|---|---|
| 6,956,893 B2 | 10/2005 | Frank et al. | |
| 7,099,299 B2 | 8/2006 | Liang et al. | |
| 7,660,340 B2 | 2/2010 | Mailaender | |
| 2003/0035469 A1* | 2/2003 | Frank et al. | 375/150 |
| 2003/0165131 A1* | 9/2003 | Liang et al. | 370/342 |
| 2005/0281323 A1* | 12/2005 | Mailaender | 375/147 |
| 2007/0053526 A1 | 3/2007 | Gaal | |

FOREIGN PATENT DOCUMENTS

| | | |
|---|---|---|
| EP | 1 530 300 A1 | 5/2005 |
| EP | 1610513 | 12/2005 |
| GB | 2 381 715 A | 5/2003 |
| RU | 2002129875 | 3/2004 |
| WO | WO0178253 | 10/2001 |

OTHER PUBLICATIONS

Bor-Sen Chen, "Robust adaptive MMSE/DFE multiuser detection in multipath fading channel with impulse noise", IEEE Transactions on Signal Processing, [see also IEEE Transactions on Acoustics, Speech, and Signal Processing], vol. 53, Issue 1, Jan. 2005 pp. 306-317.*
Dmochowski, "Frequency domain equalization for high data rate multipath channels", PACRIM. 2001 IEEE Pacific Rim Conference on Communications, Computers and signal Processing, 2001, Publication Date: 2001, vol. 2, on pp. 534-537 vol. 2 Meeting Date: Aug. 26, 2001-Aug. 28, 2001 Location: Victoria, BC, Canada.*
Tamburelli, Giovanni, "The Parallel Decision Feedback and Feedforward Equalizer", IEEE Transactions on Communications, vol. COM-31, No. 2, Feb. 1983.
Gao, Zhan et al., "A Novel Combination Algorithm Based on Chip Equalizer and Multi-path Interference Cancellation". Signal Processing, 2004, Proceedings, ICSP 04.
International Search Report issued in International Application No. PCT/US2007/064496 filed Mar. 21, 2007.

(Continued)

*Primary Examiner* — Juan A Torres
(74) *Attorney, Agent, or Firm* — S. Hossain Beladi; Liem T. Do

(57) ABSTRACT

A decision feedback equalizer (DFE) processes a signal having multiple code channels by filtering an error signal based on a difference between a received signal and an estimated received signal. The received signal is processed to recover data on each of the code channels and to generate an estimate of a transmitted signal corresponding to the received signal. A channel estimate is applied to the resulting estimated transmitted signal to generate the estimated received signal. After the filter filters the error signal, a combiner combines the filtered error signal and the estimated transmitted signal.

37 Claims, 4 Drawing Sheets

OTHER PUBLICATIONS

Written Opinion—PCT/US06/064496—International Search Authority, European Patent Office—Sep. 7, 2007.

International Preliminary Report on Patentability—PCT/US06/064496—The International Bureau of WIPO, Geneva, Switzerland—Sep. 23, 2008.

Falconer, D. et al: "Frequency Domain Equalization for Single-Carrier Broadband Wireless Systems" IEEE Communications Magazine, IEE Service Center, Piscataway, US, vol. 40, No. 4, Apr. 1, 2002, pp. 58-66, XP011092809 ISSN: 0163-6804 p. 62, Left-Hand Column Figure7.

Abdulrahman et al., "Decision Feedback Equalization for CDMA in Indoor Wireless Communications", IEEE Journal on Selected Areas in Communications, vol. 12, No. 4, pp. 698-706, May 1994.

International Search Report—PCT/US2006/064496, International Search Authority—European Patent Office—Sep. 7, 2007.

* cited by examiner

DECISION FEEDBACK EQUALIZER FOR CODE DIVISION MULTIPLEXED SIGNALS

BACKGROUND

1. Field

The present invention relates generally to communication systems and more specifically to decision feedback equalizers (DFE) for code decision multiplexed (CDM) signals.

2. Background

Decision feedback filters (DFEs) are often used to improve reception of data by applying equalization to a wireless channel. Based on demodulated data symbols, a filter is adjusted to counteract the effects of a wireless channel. A typical DFE for a single carrier signal includes a feed forward filter and a feedback filter that is based on the output of a symbol level demodulator. Unfortunately, conventional DFEs as applied to code division multiplexing systems result in chip level demodulation that is unreliable since the decisions do not take advantage of the CDM processing gain.

Therefore, there is a need for a DFE for CDM signals.

SUMMARY

A decision feedback equalizer (DFE) processes a signal having multiple code channels by filtering an error signal based on a difference between a received signal and an estimated received signal. The received signal is processed to recover data on each of the code channels and to generate an estimate of a transmitted signal corresponding to the received signal. A channel estimate is applied to the resulting estimated transmitted signal to generate the estimated received signal. After the filter filters the error signal, a combiner combines the filtered error signal and the estimated transmitted signal.

DETAILED DESCRIPTION

In the exemplary embodiment, a decision feedback equalizer (DFE) receives a code division multiplexed (CDM) signal that includes a plurality of code channels. The received signal is transmitted from a transmitter, such as a base station, through a wireless channel and received at the DFE within a portable device such as a wireless access terminal. The wireless channel has scattering and multi-fading channel characteristics resulting in multiple versions of the signal arriving at the access terminal device at different times. The received signal is processed by a linear equalizer that at least partially compensates for the wireless channel characteristics before a data estimator despreads, descrambles, and demodulates the signal to recover estimated data symbols. The estimated data symbols are modulated, scrambled, and spread by a signal re-constructor to generate an estimated transmitted signal. A channel estimate is applied to the estimated transmitted signal to generate an estimated received signal. After subtracting the estimated received signal from the received signal, the error signal is filtered by a filter that has a response partially based on the difference between the received signal and the error signal. The resulting filtered signal is combined with the estimated transmitted signal. The DFE 100 in the exemplary embodiment includes other functions and blocks that are omitted in FIG. 1 in the interest of brevity and clarity.

The word "exemplary" is used herein to mean "serving as an example, instance, or illustration." Any embodiment described herein as "exemplary" is not necessarily to be construed as preferred or advantageous over other embodiments.

Figure 1:
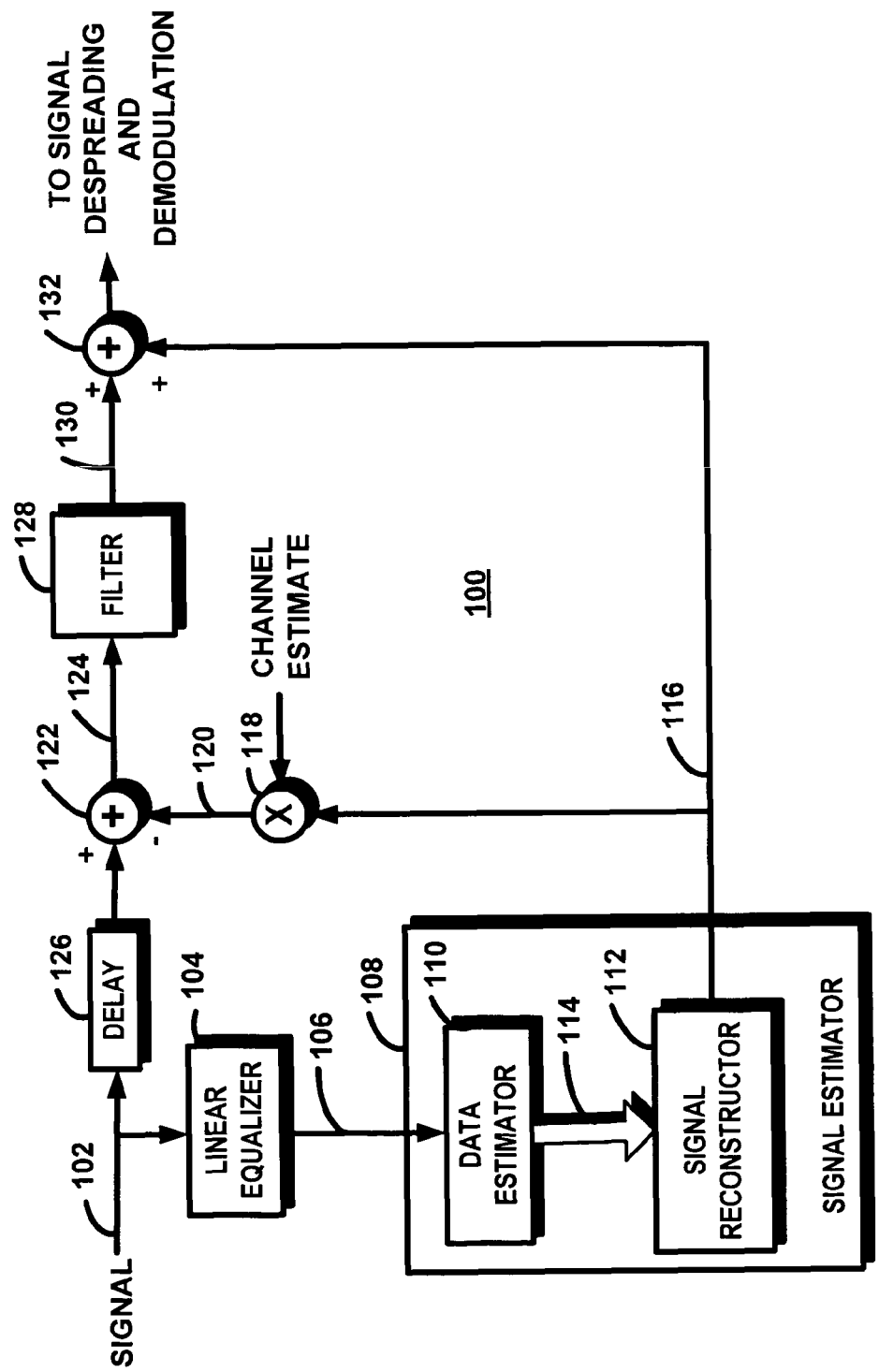
FIG. 1 is a block diagram of a decision feedback equalizer (DFE) in accordance with the exemplary embodiment of the invention.

FIG. 1 is a block diagram of a decision feedback equalizer (DFE) in accordance with an exemplary embodiment of the invention. The DFE 100 may be implemented in any combination of hardware, software and/or firmware. In the exemplary embodiment, the software code running on a processor within the access terminal executes the calculations, comparisons, and adjustments to perform the functions of the DFE 100. The various functions and operations of the blocks described with reference to the DFE 100 may be implemented in any number of devices, circuits, or elements. Two or more of the functional blocks may be integrated in a single device and the functions described as performed in any single device may be implemented over several devices in some circumstances. Depending on the particular implementation, the signals may be processed in the time domain or in the frequency domain as discussed below with reference to FIG. 3.

A received signal 102 corresponding to a transmitted signal transmitted by a transmitter and through a wireless channel is received at the DFE 100. In the exemplary embodiment, the DFE 100 is implemented as part of a receiver within an access terminal such as Code Division Multiple Access (CDMA) handset, portable telephone, wireless personal digital assistant (PDA) or other wireless device. Accordingly, the received signal 102 may be received through antennas, low noise amplifiers (LNAs), and other hardware. Depending on the implementation of the DFE 100, the hardware may be considered as part of the wireless channel or may be treated as a separate mechanism acting on the signal.

The received signal 102 is processed by a linear equalizer 104 that has a response based on a channel estimate of the wireless channel characteristics. The channel estimate may be obtained using any of numerous techniques. An example of suitable technique is discussed in patent application Ser. No. 11/386,530, filed Mar. 21, 2006, entitled "Communication Channel Estimation," which is incorporated by reference in its entirety herein. The resulting initially equalized signal 106 is processed by a signal estimator 108 to generate an estimated transmitted signal 116. A data estimator 110 processes the equalized signal 106 to generate estimated data 114 which is processed by the signal reconstructor 112. The data estimator 110 despreads, descrambles and demodulates the initially equalized signal 106 to determine estimated data 114 of the transmitted data. Although in some circumstances a soft decision may be applied, a hard decision is applied to determine data symbols in the exemplary embodiment. The data estimator 110 processes all of the code channels within the received signal 102. Accordingly, if sixteen code channels are used for transmission within the wireless channel, sixteen sets of data are generated as an estimate. In FIG. 1, arrow 114 is shown as a block arrow to illustrate that multiple data signals are generated by the data estimator 110. The data estimator, therefore, applies a plurality of pseudorandom codes to despread the coded channels and applies other signal processing such as descrambling before applying the appropriate demodulation such as quadrature amplitude modulation (QAM).

The signal reconstructor 112 generates the estimated transmitted signal 116 by processing the estimated data 114 using the same technique that is used by the transmitter to process the originally transmitted data. The signal reconstructor 112 includes a modulator, scrambler, and spreader in the exemplary embodiment. The estimated data 114 is modulated using the originally used modulation scheme, scrambled using the originally used scrambling technique. The appropriate pseudorandom code is applied to the signal to generate the estimated transmitted signal 116. The output of the signal estimator 108, therefore, is an estimate of the originally transmitted signal transmitted by the base station referred to as the estimated transmitted signal 116. Therefore, the estimated transmitted signal 116 is the transmitted signal before transmission through the wireless channel.

A virtual wireless channel processor 118 such as a finite impulse response (FIR) filter applies the channel estimate to the estimated transmitted signal 116 to generate the estimated received signal 120. If the initially equalized signal 106 does not contain excessive errors, such as significant residual multipath interference or receiver noise, then the estimated received signal 120 will be identical to the received signal 102. A combiner 122 generates an error signal 124 by subtracting the estimated received signal 120 from the received signal 102. A delay 126 provides the appropriate time processing to the received signal 102 in order synchronize the two signals 102, 120, before the subtraction function.

The error signal 124 is processed by a filter 128 having a response based partially on the channel estimate and on a relationship between the received signal 102 and the estimated received signal 120. The filtered signal 130, therefore, is based on the power contained in the error signal 124, the channel estimate, and parameters based on the relationship between the received signal 102 and the estimated received signal 120. In the exemplary embodiment, the filter is a linear equalizer having a response based on the channel estimate, a noise estimate and a pulse shape and employs a minimum mean-square error (MMSE) function. An example of a suitable filter 128 is discussed in further detail with reference to FIG. 3. After filtering, the resulting filtered error signal is combined with the estimated transmitted signal 116. The combined signal is forwarded to signal processing such as despreading and demodulation. In the exemplary embodiment, the filter 128 has a response of the linear equalizer 104 further based on the relationship between the estimated received signal and the received signal.

A review of the following exemplary situations further reveals the operation of the DFE 100. Where the initially equalized signal 106 contains only small errors, the estimated transmitted signal 116 is identical to the transmitted signal. Applying the channel estimate results in an estimated received signal 120 that is the same as the received signal 102, except for the received noise, which is only contained in the received signal 102, and possibly channel estimation error, which is only contained in estimated received signal 120. If both the received noise and the channel estimation error are small, then the output of the combiner 122 is close to zero and the filtered signal 130 is also close to zero. Adding the estimated transmitted signal 116 to a signal close to zero results in a combined signal that accurately represents the transmitted signal.

For a situation where the initially equalized signal 106 contains significant errors, the resulting estimated received signal 120 will have an error and the difference between the two signals is at least partially corrected by the filter 128. As result of significant errors contained in equalized signal 106, a symbol may be incorrectly determined to be, for example, a+1 when the original symbol was transmitted as a−1. The incorrect symbol, with the other estimated data, is modulated, spread, and scrambled by the signal reconstructor to generate the estimated transmitted signal 116. After the channel estimate is applied, the resulting estimated received signal 120 reflects the inaccurate symbol estimate. When the estimated received signal 120 is subtracted from the received signal 102, the error signal 124 reflects the inaccuracy of the estimated transmitted signal 116. Since the filter response is partly based on a relationship between the received signal 102 and the estimated received signal 120, the resulting filtered signal 130 is an estimate of the error signal with the impact of the radio channel characteristics reduced.

A linear equalizer or any other suitable filter applied in the signal processing path has to operate based on a trade-off between minimizing the effect of the radio channel dispersion (i.e. multi-path propagation) and minimizing noise amplification. A linear equalizer can be designed to achieve the best available trade-off between those two factors for the received signal 102. On the other hand, the filter 128 that operates on the error signal 124 as opposed to operating on the received signal itself can achieve an even better trade-off because the radio channel dispersion will have a reduced impact, in other than very low SNR conditions, due to the fact that the error signal 124 contains less power than the received signal 102.

Therefore, the DFE 100 compensates for the channel characteristics by basing a linear equalizer (filter) 128 response on a relationship between the reconstructed estimated received signal and the received signal 102. In some situations, the error can be reduced by increasing the number of iterations through the filter and comparing a previous estimated received signal to current estimated received signal.

Figure 2:
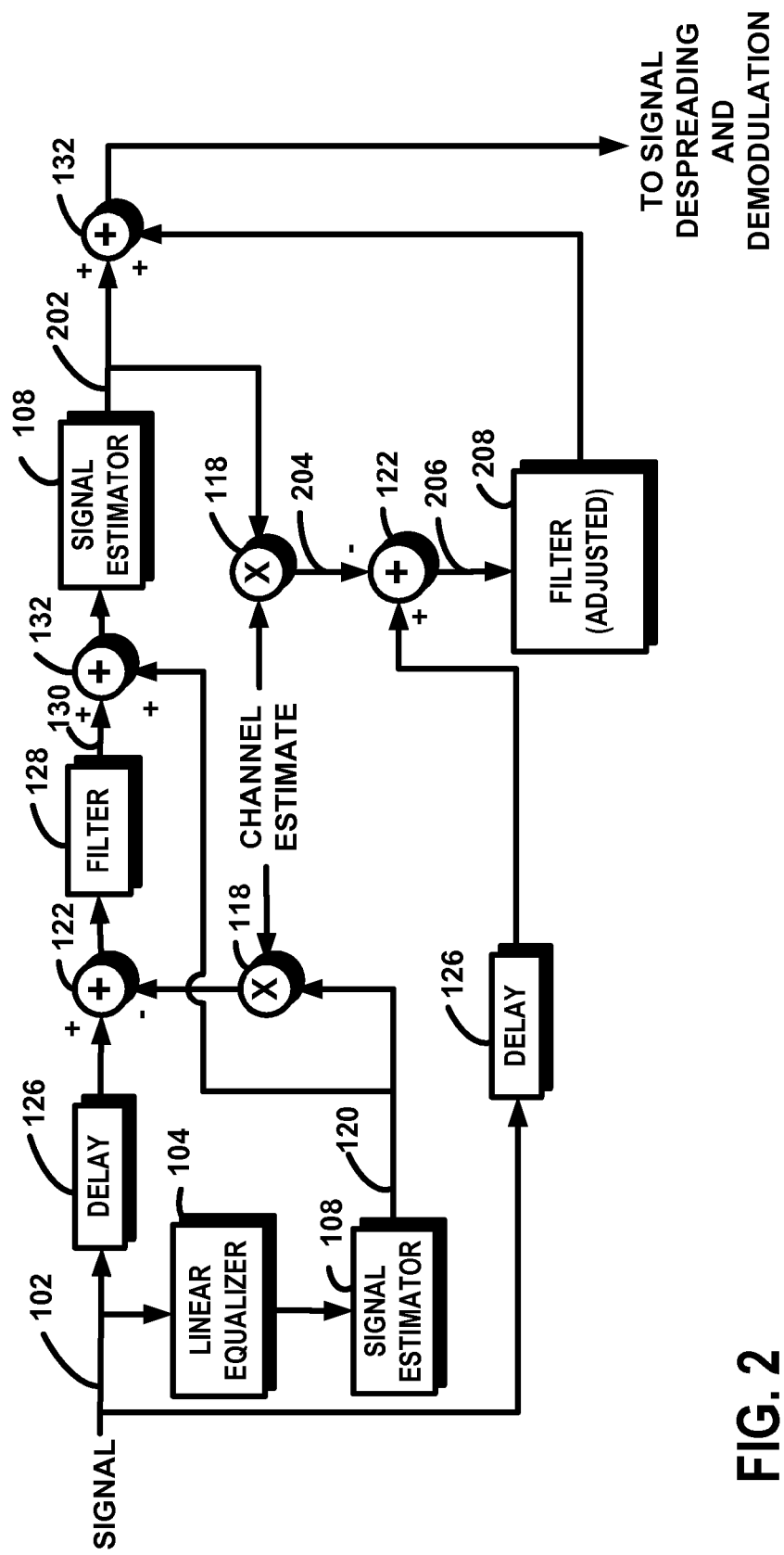
FIG. 2 is a block diagram of the DFE including a second iteration in accordance with the exemplary embodiment of the invention.

FIG. 2 is block diagram of the exemplary DFE 100 where a second iteration is applied to the estimated received signal. After processing the received signal as described above, the combined signal from the combiner 132 is processed by the signal estimator 108. The signal is despread, descrambled and demodulated to generate estimated transmitted signal 202. The channel estimate is applied to the second estimated transmitted signal 202 to determine a second estimated received signal 204. The second estimated received signal 204 is subtracted from the received signal 102 to generate a second error signal 206 that is filtered by the filter 208 having an adjusted response based on the relationship between the second estimated received signal 202 and the estimated received signal 120. Therefore the second filter 208 is the filter 128 with an adjusted response in the exemplary embodiment. The output of the second filter 208 is combined with the second estimated transmitted signal 202 before further processing in the receiver. Multiple iterations can be performed in a similar manner in some circumstances.

Figure 3:
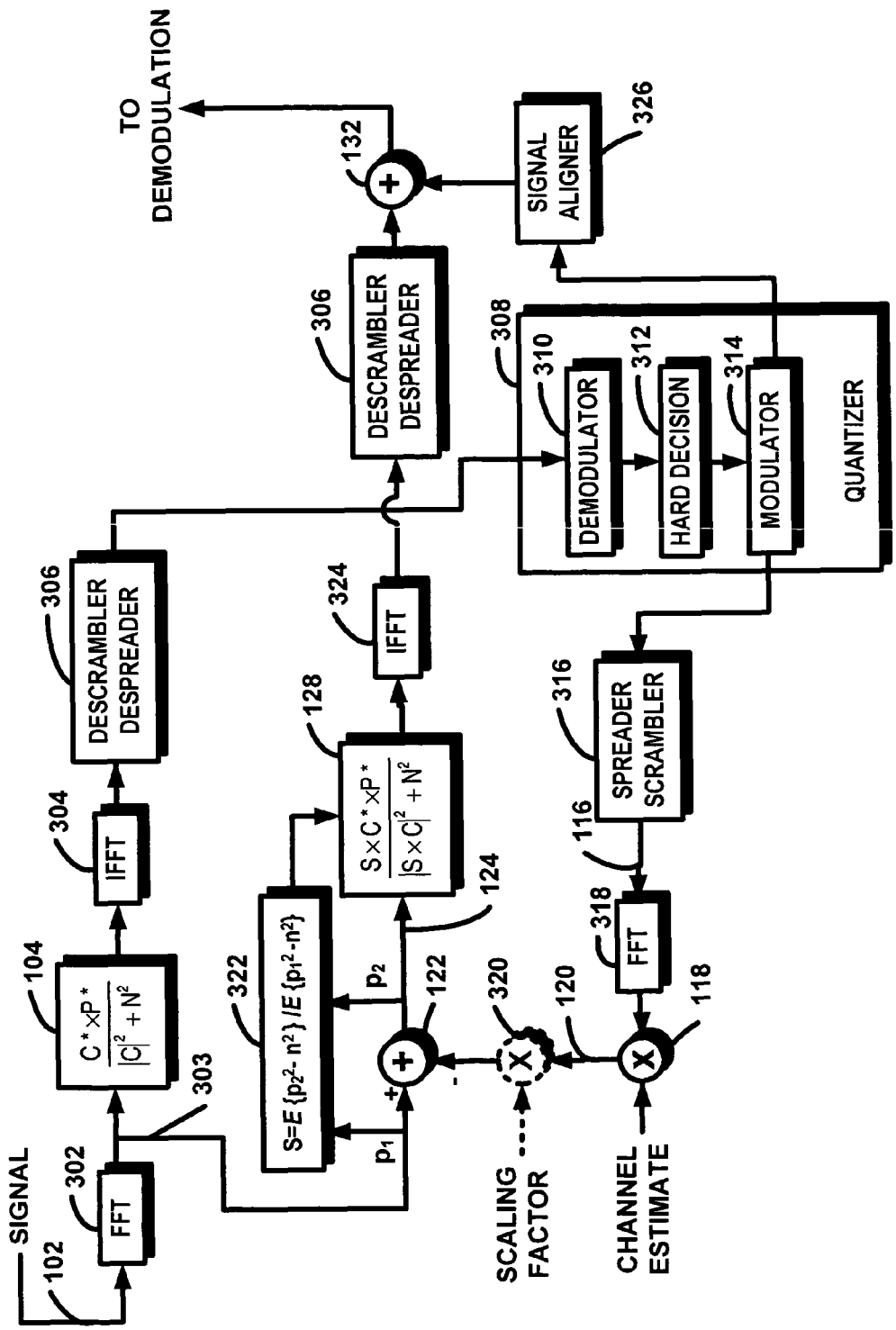
FIG. 3 is a block diagram of the exemplary DFE where filtering is performed in the frequency domain.

FIG. 3 is a block diagram of the exemplary DFE 100 where processing is performed in the frequency domain. Accordingly, the received signal 102 is transformed from the time domain to the frequency in the exemplary DFE 100 discussed with reference to FIG. 3. As discussed above, the DFE 100 may be implemented in the time domain in some circumstances.

A Fast Fourier Transform (FFT) processor 302 transforms the received signal to the frequency domain yielding received signal spectrum 303 that is provided to the linear equalizer 104 and the combiner 122. In the exemplary DFE 100, the linear equalizer 104 has a response equal to $(c^* \times p^*)/(|c|^2 + n^2)$, where $c^*$ is the complex conjugate of the channel estimate, p* is the complex conjugate of the spectrum of the pulse shape and n is the noise spectrum estimate. The response of the linear equalizer 104 is dependent on frequency and therefore each of the parameters is a function of frequency. Other linear equalizers may be used in some circumstances. After the linear equalizer 104 processes the received signal spectrum 303 in the frequency domain, an inverse FFT (IFFT) processor 304 transforms the equalized signal to the time domain. The resulting signal is processed by a descrambler/despreader 306 to descramble and despread the signal. In some situations, the received signal is not scrambled and the descrambling function is not required. A quantizer 308 determines and sets the data values to the closest constellation value. In the exemplary embodiment, the despread signal is demodulated by a demodulator 310 and a hard decision is applied in 312 to determine the best estimate of the constellation point represented by the data symbol. For example, where the modulation scheme is in accordance with 16-QAM (16 quadrature amplitude modulation), the phase and amplitude of the vector representing the symbol is estimated as applying to the closest constellation point of the 16 points and modulator 314 the hard decision to set the vector to the constellation point. The spreader/scrambler 316 applies the same spreading and scrambling schemes applied by the base station to generate the estimated transmitted signal 116. Therefore, the descrambler/despreader 306, the quantizer 308 and the spreader/scrambler 316 provide an exemplary technique for performing the functions of the signal estimator 108.

The estimated transmitted signal 116 is transformed to the frequency domain by a FFT processor 318 before the channel estimate is applied. In some circumstances, a scaling processor 320 applies a scaling factor based on the estimated signal to noise ratio (SNR) before the estimated received signal 120 is subtracted from the received signal spectrum 303. As discussed below, the scaling factor minimizes or eliminates the contribution of the estimated received signal 120 when the signal to noise ratio is low.

A coefficient generator 322 determines a coefficient, S, that is applied to the linear equalizer to generate the filter 128. In the exemplary embodiment, S is equal to $E\{p_2^2-n^2\}/E\{p_1^2-n^2\}$, $p_2$ is the power contained in error signal 124 averaged across the signal bandwidth at the output of the combiner 122, $p_1$ is the power contained in the received signal spectrum 303 averaged across the signal bandwidth and n is the estimated power of the noise averaged across the signal bandwidth. The filter response in the exemplary DFE 100 is equal to $$\frac{S \times C^* \times P^*}{|S \times C|^2 + N^2}.$$

Therefore, when $p_2$ is equal to $p_1$, S is equal to one and the response of the filter 128 is the same as the response of the linear equalizer 104. In low SNR situations, when the estimated transmitted signal 116 is dominated by decision errors made by quantizer 308, $E\{p_2^2-n^2\}$ is approximately equal to two times $E\{p_1^2-n^2\}$, which results in a maximum coefficient S equal to two. In such low SNR situations, however, it is beneficial to de-weight the estimated received signal 120 since it does not carry useful information. An example of a suitable scaling factor is a factor equal to $1-e^{k1 \times SNR\_est}$ applied in 320, where k1 is constant and SNR_est is an estimate of the signal to noise ratio. When used, the scaling factor provides a mechanism for minimizing or eliminating the effect of the estimated received signal on the received signal. For example, if the SNR is sufficiently low, the estimated received signal is not applied to the combiner 122 and the received signal 102 is the same as the error signal, the coefficient S equals one and the filter response is the same as the linear equalizer response. An example of another suitable solution to applying a scaling factor in 320 includes applying soft decisions in the quantizer 308 instead of the hard decision 312. In low SNR situations, the soft decisions could be zeros, leading to the same end result as applying a zero scaling factor in 320. Although the filter response is a function of frequency, notation indicating the dependence is omitted in the interest of brevity and clarity.

The filtered signal is transformed to the time domain by the IFFT 324 and the descrambler/despreader 306 descrambles and despreads the time domain signal. The remaining modulated symbols represent the difference in the resulting data of the estimated received signal and the data of the received signal. The modulated error symbols are combined with the estimated transmitted modulation symbols in the combiner 132. The signal aligner 326 stores the modulated symbols resulting from the operation of modulator 314 and delays the data in order to align the data with the corresponding modulated error symbols. The combined signal is forwarded to the signal demodulation where soft demodulation may be applied.

Figure 4:
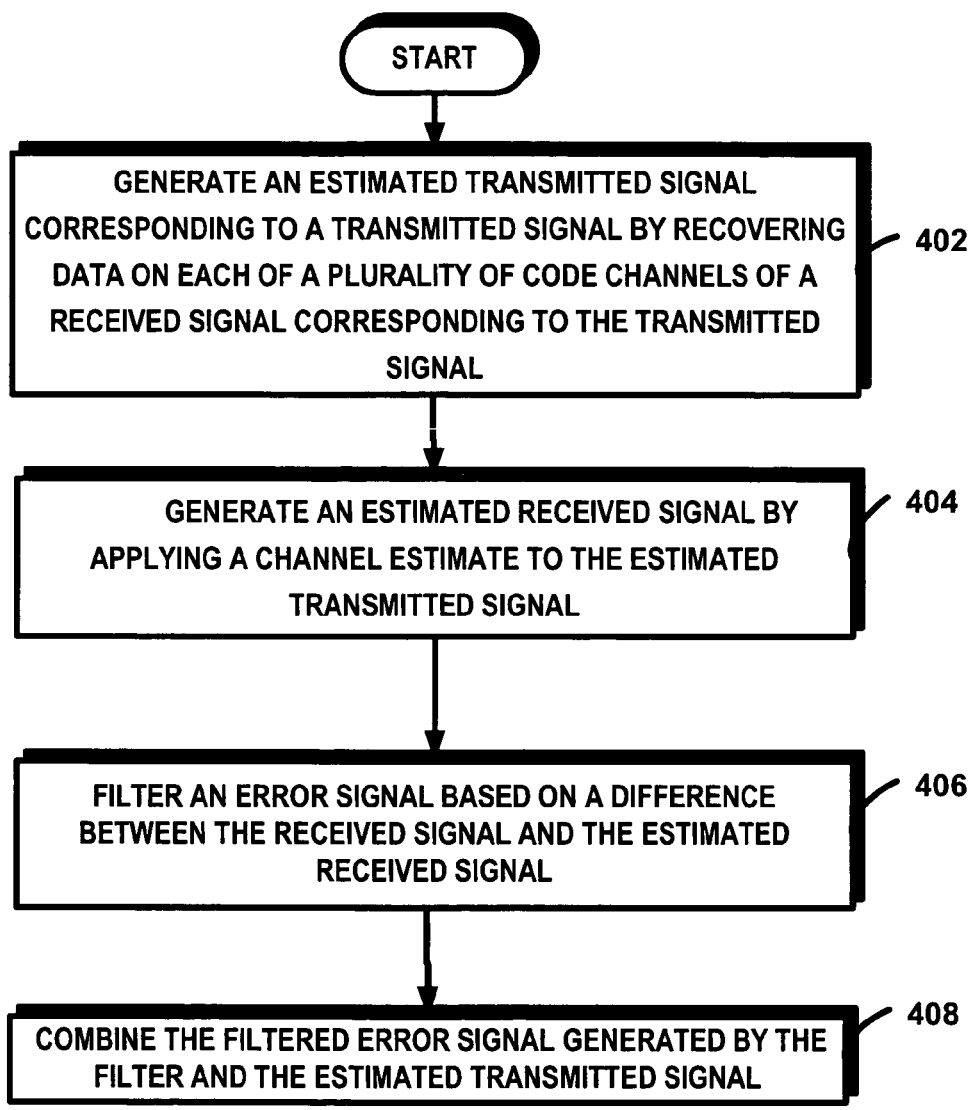
FIG. 4 is a flow chart of a method of processing a received signal in accordance with the exemplary embodiment of the invention.

FIG. 4 is flow chart of a method of processing a received signal in accordance with the exemplary embodiment of the invention. The exemplary method is performed by components and software within an access terminal facilitating functions described above with reference to FIGS. 1-3. The method, however, may be performed by any combination of hardware, software and/or firmware.

At step 402, an estimated transmitted signal is generated. In the exemplary embodiment, the received signal is processed by a linear equalizer before the equalized signal is despread, descrambled and demodulated to generate the estimated transmitted data. The estimated transmitted data is modulated, scrambled and spread in accordance with the techniques used in the base station to generate the estimated transmitted signal.

At step 404, a channel estimate is applied to the estimated transmitted signal to generate the estimated received signal.

At step 406, an error signal based on the difference between the received signal and the estimated received signal is filtered by a filter having a response at least partially based on the channel estimate. In the exemplary embodiment, the filter has a response based on a comparison between the error signal and the received signal.

At step 408, the filtered error signal is combined with the estimated transmitted signal. In the exemplary embodiment, the filtered error signal is despread and descrambled and the resulting signal is added to the modulated estimated data. Accordingly, the modulated estimated data is stored or delayed and combined with the filtered despread and descrambled error signal.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A decision feedback equalizer (DFE) comprising:
   a signal estimator configured to process a received signal to recover data on each of a plurality of code channels and to generate an estimated transmitted signal of a transmitted signal corresponding to the received signal;
   a virtual channel processor configured to apply a channel estimate to the estimated transmitted signal to generate an estimated received signal;
   a filter configured to filter an error signal based on a difference between the received signal and the estimated received signal, wherein the filter comprises a filter response based on a relationship between the received signal and the error signal; and
   a combiner configured to combine a filtered error signal generated by the filter and the estimated transmitted signal.

2. The DFE in accordance with claim 1, wherein the signal estimator comprises:
   a data estimator configured to despread and demodulate each of the plurality of code channels to recover the data; and
   a signal reconstructor configured to modulate and spread the data to generate the estimated transmitted signal.

3. The DFE in accordance with claim 2 wherein the data estimator is further configured to descramble each of the plurality of code channels.

4. The DFE in accordance with claim 1, wherein the filter response is further based on the channel estimate.

5. The DFE in accordance with claim 4, wherein the filter response is further based on an estimated noise of the received signal.

6. The DFE in accordance with claim 4, wherein the filter response is further based on a pulse shape.

7. The DFE in accordance with claim 1, further comprising:
   a linear equalizer configured to equalize the received signal before the signal estimator generates the estimated transmitted signal.

8. The DFE in accordance with claim 7, wherein the filter is a linear equalizer.

9. The DFE in accordance with claim 1, wherein the relationship between the received signal and the error signal is a power ratio.

10. The DFE in accordance with claim 9, wherein the power ratio is defined as:

$$\frac{E\{p_2^2 - n^2\}}{E\{p_1^2 - n^2\}},$$

where $p_1^2$ is a power contained in the received signal averaged across a signal bandwidth, $p_2^2$ is a power contained in the error signal averaged across the signal bandwidth, and $n^2$ is an estimated power of the noise across the signal bandwidth.

11. A decision feedback equalizer (DFE) comprising:
   a linear equalizer configured to apply an equalization to a received signal to reduce wireless channel effects and to generate an equalized received signal;
   a despreader configured to despread the equalized signal to generate a despread signal;
   a demodulator configured to demodulate the despread signal to generate estimated data;
   a modulator configured to modulate the estimated data to generate an estimated modulated signal;
   a spreader configured to spread the estimated data to generate an estimated transmitted signal of a transmitted signal corresponding to the received signal;
   a virtual channel processor configured to apply a channel estimate to the estimated transmitted signal to generate an estimated received signal;
   a filter configured to filter an error signal based on a difference between the received signal and the estimated received signal, the filter having a response based, at least partially, on the channel estimate and a relationship between the received signal and the error signal, the despreader configured to despread a filtered error signal generated by the filter; and
   a combiner configured to combine the estimated modulated signal and the despread filtered error signal.

12. The DFE in accordance with claim 11, further comprising:
a descrambler configured to descramble a despreader output of the despreader; and
a scrambler configured to scramble a spreader output of the spreader.

13. The DFE in accordance with claim 11, further comprising:
a first Fast Fourier Transform (FFT) processor configured to transform the received signal from a time domain to a frequency domain;
an inverse FFT processor configured to transform the filtered error signal from the frequency domain to the time domain; and
a second FFT processor configured to transform a scrambler output from the time domain to the frequency domain.

14. The DFE in accordance with claim 11, wherein the relationship between the received signal and the error signal is a power ratio.

15. The DFE in accordance with claim 14, wherein the power ratio is defined as:

$$\frac{E\{p_2^2 - n^2\}}{E\{p_1^2 - n^2\}},$$

where $p_1^2$ is a power contained in the received signal averaged across a signal bandwidth, $p_2^2$ is a power contained in the error signal averaged across the signal bandwidth, and $n^2$ is an estimated power of the noise across the signal bandwidth.

16. A method for receiving a code division multiplexed (CDM) signal, the method comprising:
generating an estimated transmitted signal corresponding to a transmitted signal by recovering data on each of a plurality of code channels of a received signal corresponding to the transmitted signal;
generating an estimated received signal by applying a channel estimate to the estimated transmitted signal;
filtering an error signal based on a difference between the received signal and the estimated received signal and based on a relationship between the received signal and the error signal; and
combining the filtered error signal generated by the filter and the estimated transmitted signal.

17. The method in accordance with claim 16, wherein the generating the estimated transmitted signal comprises:
despreading and demodulating each of the plurality of code channels to estimate transmitted data; and
modulating and spreading the estimated transmitted data to generate the estimated transmitted signal.

18. The method in accordance with claim 17, further comprising:
descrambling each of the plurality of code channels before demodulating; and
scrambling the estimated transmitted data after modulating the estimated transmitted data.

19. The method in accordance with claim 16, wherein the filtering comprises filtering based on the channel estimate.

20. The method in accordance with claim 19, wherein the filtering comprises filtering based on an estimated noise of the received signal.

21. The method in accordance with claim 19, wherein the filtering comprises filtering based on a pulse shape.

22. The method in accordance with claim 16, further comprising:
applying linear equalization to the received signal before the generating the estimated transmitted signal.

23. The method in accordance with claim 16, wherein the relationship between the received signal and the error signal is a power ratio.

24. The method in accordance with claim 23, wherein the power ratio is defined as:

$$\frac{E\{p_2^2 - n^2\}}{E\{p_1^2 - n^2\}},$$

where $p_1^2$ is a power contained in the received signal averaged across a signal bandwidth, $p_2^2$ is a power contained in the error signal averaged across the signal bandwidth, and $n^2$ is an estimated power of the noise across the signal bandwidth.

25. A program product for applying decision feedback filtering to code division multiplexed signals, the program product comprising:
a non-transitory computer-readable medium containing computer-executable logic and configured for causing the following computer-executed step to occur:
generating an estimated transmitted signal corresponding to a transmitted signal by recovering data on each of a plurality of code channels of a received signal corresponding to the transmitted signal;
generating an estimated received signal by applying a channel estimate to the estimated transmitted signal;
filtering an error signal based on a difference between the received signal and the estimated received signal and based on a relationship between the received signal and the error signal; and
combining the filtered error signal generated by the filter and the estimated transmitted signal.

26. The program product in accordance with claim 25, the computer-executable logic further configured for causing the following computer-executed step to occur:
despreading and demodulating each of the plurality of code channels to estimate transmitted data; and
modulating and spreading the estimated transmitted data to generate the estimated transmitted signal.

27. The program product in accordance with claim 25, wherein the relationship between the received signal and the error signal is a power ratio.

28. The program product in accordance with claim 27, wherein the power ratio is defined as:

$$\frac{E\{p_2^2 - n^2\}}{E\{p_1^2 - n^2\}},$$

where $p_1^2$ is a power contained in the received signal averaged across a signal bandwidth, $p_2^2$ is a power contained in the error signal averaged across the signal bandwidth, and $n^2$ is an estimated power of the noise across the signal bandwidth.

29. An apparatus for wireless communication, comprising:
means for generating an estimated transmitted signal corresponding to a transmitted signal by recovering data on each of a plurality of code channels of a received signal corresponding to the transmitted signal;
means for generating an estimated received signal by applying a channel estimate to the estimated transmitted signal;
means for filtering an error signal based on a difference between the received signal and the estimated received signal and based on a relationship between the received signal and the error signal; and means for combining the filtered error signal generated by the filter and the estimated transmitted signal.

30. The apparatus in accordance with claim 29, wherein the means for generating the estimated transmitted signal comprises:

means for despreading and demodulating each of the plurality of code channels to estimate transmitted data; and means for modulating and spreading the estimated transmitted data to generate the estimated transmitted signal.

31. The apparatus in accordance with claim 30, further comprising:

means for descrambling each of the plurality of code channels before demodulating; and means for scrambling the estimated transmitted data after modulating the estimated transmitted data.

32. The apparatus in accordance with claim 29, wherein the means for filtering comprises means for filtering based on the channel estimate.

33. The apparatus in accordance with claim 32, wherein the means for filtering comprises means for filtering based on an estimated noise of the received signal.

34. The apparatus in accordance with claim 32, wherein the means for filtering comprises means for filtering based on a pulse shape.

35. The apparatus in accordance with claim 29, further comprising means for applying linear equalization to the received signal before the generating the estimated transmitted signal.

36. The apparatus in accordance with claim 29, wherein the relationship between the received signal and the error signal is a power ratio.

37. The apparatus in accordance with claim 36, wherein the power ratio is defined as:

$$\frac{E\{p_2^2 - n^2\}}{E\{p_1^2 - n^2\}},$$

where $p_1^2$ is a power contained in the received signal averaged across a signal bandwidth, $p_2^2$ is a power contained in the error signal averaged across the signal bandwidth, and $n^2$ is an estimated power of the noise across the signal bandwidth.

* * * * *